July 13, 1965   A. BARNESE   3,194,385
SCREW-TYPE CONVEYOR WITH RESILIENT BEARING MEANS
Filed Jan. 15, 1962

ANTHONY BARNESE
INVENTOR

HUEBNER & WORREL
ATTORNEYS

BY
Richard M. Worrel

United States Patent Office 3,194,385
Patented July 13, 1965

3,194,385
SCREW-TYPE CONVEYOR WITH RESILIENT
BEARING MEANS
Anthony Barnese, Fresno, Calif.
(5233 Lindsey, Apt. 1, Pico Rivera, Calif.)
Filed Jan. 15, 1962, Ser. No. 166,173
5 Claims. (Cl. 198—64)

This invention relates to spiral or screw-type conveyors and more particularly to a unique construction for an auger adapted to be employed in such conveyors.

Such screw conveyors normally include an auger enclosed by a tubular casing constituting a delivery conduit and provide a hopper in communication with the casing. In certain environments, screw conveyors are utilized to transport granular material from the mixing or delivery hopper to a point of deposition spaced from the hopper. In using such conveyors to transport wet, sticky materials, such as mortar and flowable concrete, a problem exists in forming an effective seal between the spiral auger and the enveloping casing. Additional problems have been encountered in providing a suitable support for the auger within the delivery conduit and in providing bearing structure to absorb the longitudinal thrust forces encountered in moving dense, heavy materials in an axial direction. The magnitude of such thrust forces encountered in transporting amorphous concrete mixtures by a screw conveyor will be readily appreciated.

In the past, it has been a practice to provide the augers of such conveyors with a peripheral ribbon of extremely hard material such as Stellite. Although such material has excellent wear characteristics, it is not satisfactory to form a seal between the outer periphery of the auger and the internal surface of the delivery conduit. Consequently, small particles of material are allowed to pass between and to engage these surfaces. With abrasive materials, such as the sand and gravel in concrete, accelerated wear of the auger and delivery conduit occurs.

Accordingly, it is the principal object of the present invention to provide an improved screw conveyor having an effective seal between the cooperating elements rotating relative to each other.

Another object is to provide an auger for a screw conveyor which carries a resilient seal at its periphery.

Another object of the present invention is to provide an auger for a screw conveyor in which the sealing pressure between the periphery of the auger and the stationary portion of the conveyor may be selectively adjusted.

A further object is to provide a resilient inflatable seal for the auger of a screw conveyor and mounting means to permit the ready installation, removal or replacement of the seal.

A still further object is to provide unique bearing means to absorb thrust forces encountered in a screw conveyor.

These, together with other objects, will become more fully apparent upon reference to the following description and accompanying drawing.

Figure 1:
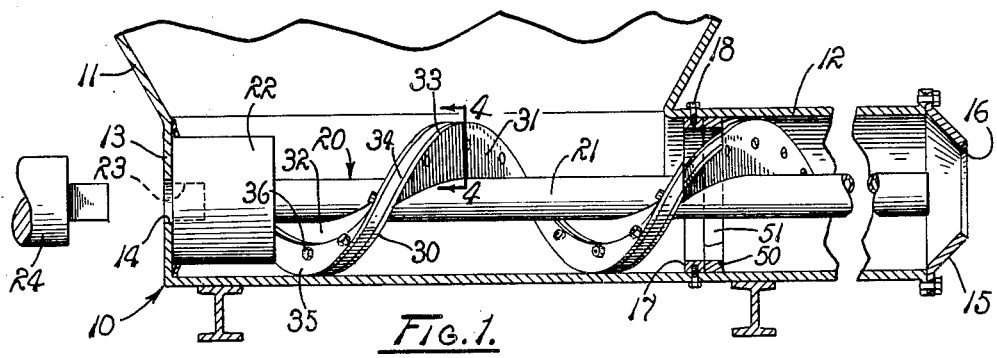
FIG. 1 is a fragmentary view in vertical longitudinal section of a screw conveyor embodying the principles of the present invention, the auger screw being shown in side elevation and provided with an exaggerated pitch for illustrative convenience.
Figure 2:
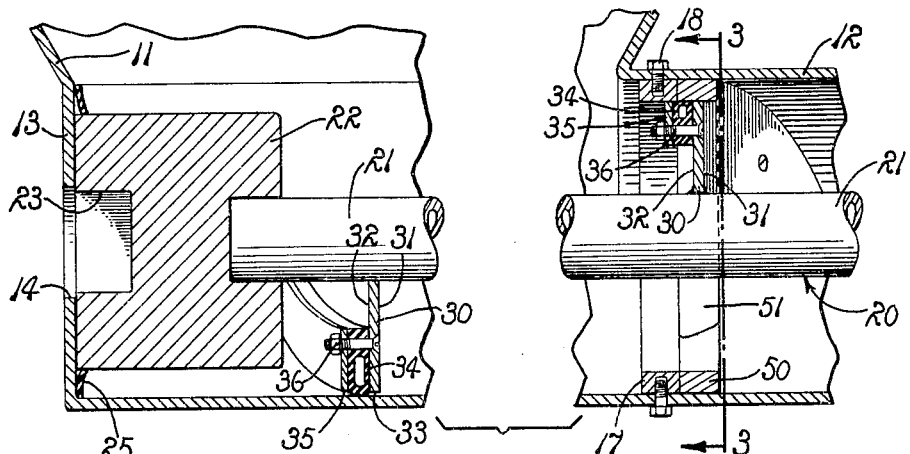
FIG. 2 is a fragmentary view, somewhat enlarged, in vertical, longitudinal section, of the conveyor structure shown in FIG. 1.
Figure 3:
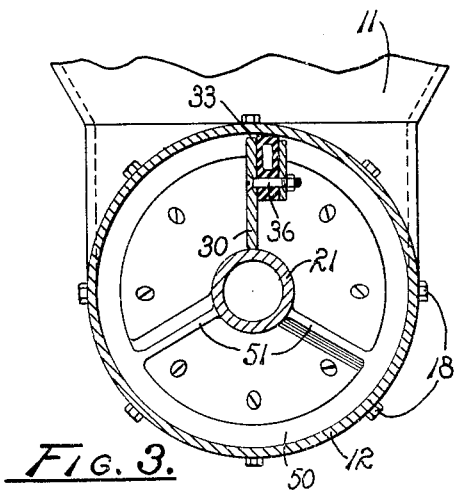
FIG. 3 is a view in vertical, transverse section taken on line 3—3 of FIG. 2.

Referring to FIGS. 1, 2 and 3 of the drawings, a portion of a supporting frame is generally indicated at 10. The frame includes a delivery hopper 11 defining a cavity to receive material. The hoper has an elongated delivery tube 12 joined thereto in communication with the cavity and extended in an axial direction, to the right as viewed in FIG. 1. The delivery tube is circumscribed about a predetermined longitudinal axis and provides a cylindrical tube of a substantially uniform diameter and having a smooth internal surface. A rear closure plate is indicated at 13 which serves as a reaction member. The plate is provided with a central aperture 14 axially aligned with the delivery tube. The forward or delivery end of the tube carries a nozzle portion 15. The nozzle is provided with a discharge opening 16 and in many installations, the nozzle is detachably secured to the tube by means of the bolted flanged connection, as shown, or by other suitable means. Mounted internally of the tube and intermediate the ends thereof is a thrust reaction ring 17 detachably secured to the tube by means of a plurality of cap screws 18. It can be seen that the tube constitutes an axial passageway in communication with the delivery hopper.

An auger 20 is slidably and rotatably received within the tube 12. The auger includes a central spindle 21 carrying at one end a drive coupling 22. The drive coupling is provided with a socket 23 axially aligned with the aperture 14 in the rear closure plate to admit a driver 24 having a configuration conforming to that of the socket. The driver may be a power take-off from a self-propelled vehicle, such as a truck or tractor, or may be a drive shaft from any other suitable source of power. The drive coupling is also provided with a seal 25 in intimate contact with the plate 13 to prevent the escape of readily flowable and semiliquid materials to be transported by the conveyor.

Radially projected from the central spindle is a helical rib 30 having respective front and rear faces 31 and 32 and a peripheral surface 33. A ribbon of rubber or other like elastomer material 34 is carried by the helical rib at its rear face by means of a helical retaining plate 35 secured to the rib by a plurality of bolts 36. The bolts are preferably mounted in the rib in a countersunk manner as illustrated. The plate may be segmented as desired.

Figure 4:
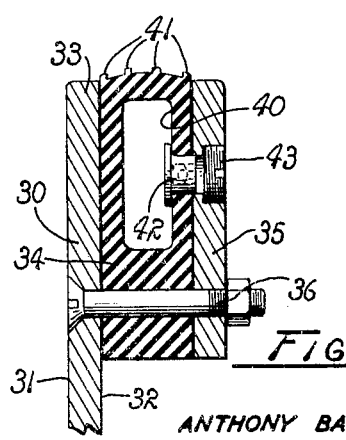
FIG. 4 is a fragmentary view in vertical, transverse section, somewhat enlarged, taken on line 4—4 of FIG. 1.

The ribbon 34 is of a radial dimension less than the supporting rib 30 and is generally rectangular in cross-section. The ribbon is provided with an internal chamber 40 extending throughout the length of the ribbon. Radially projecting from the ribbon and in contact with the internal surface of the tube 12 is a plurality of wiping ribs 41 extending throughout the length of the ribbon 34. The wiping ribs constitute a peripheral bearing and sealing surface for the auger and engage the inner surface of the cylindrical delivery tube 12. As shown in FIG. 4, the rubber ribbon is provided with an inflation valve 42 in communication with the chamber 40. Access to the inflation valve is gained by means of a removable plug 43 threaded into a suitable bore in the front face of the helical rib 30.

The auger is provided with an intermediate thrust ring 50 circumscribing the auger at its outer periphery and supported at one point by the helical rib 30 and at circumferentially spaced points by radial spokes 51. The mounting of this thrust ring is clearly illustrated in FIG. 3.

Operation

The operation of the described embodiment of the subject invention is believed to be readily apparent and is briefly summarized at this point. Prior to installing the auger 20 within the delivery tube 12, the rubber ribbon 34 is secured to the rib 30 and the demountable reaction ring 17 is placed in engagement with the thrust ring 50 carried by the auger. The entire assembly is then inserted from the forward end of the delivery tube. If the nozzle 15 has a discharge opening of a size insufficient to admit the auger, removal of the nozzle will permit the insertion of the auger. After insertion of the auger assembly within the delivery tube, the stationary thrust ring 17 is secured to the delivery tube by means of the cap screws 18. Prior to replacement of the nozzle on the delivery tube, if it has been removed, the rubber ribbon 34 is inflated at a desired pressure by means of the valve 42. The plug 43 is then inserted in the front face of the rib 30 to seal the valve from any of the material subsequently to be admitted to the tube.

The driver 24 is then inserted through the aperture 14 and connected to the drive coupling 22. Flowable material, such as for example wet concrete, is then admitted to the cavity of the hopper 11. The driver is subsequently rotated by any suitable source of power in a clockwise direction, as viewed from the left end, as shown in FIG. 1. During rotation of the auger 20, the front face 31 of the helical rib 30 motivates the material to the right, as viewed in FIG. 1. The inflated ribbon 34, carried by the helical rib 30, forms an effective seal between the periphery of the auger and the internal surface of the delivery tube. Consequently, a maximum quantity of material is transported in relation to the number of revolutions of the auger, and as will be appreciated, the efficiency of the screw conveyor is greatly improved. The inflated ribbon 34 also serves as a supporting bearing in conjunction with the delivery tube 12.

The axial thrust resulting from conveying dense material, such as concrete, is transmitted by the annular thrust ring 50 to the frame by means of the reaction ring 17. Depending upon the axial dimensions of the auger and density of material to be conveyed, several pairs of such thrust transmission rings may be spaced along the tube and the auger. With such thrust rings, a minimum amount of deflection results in the helical rib. Since deflection is greatly diminished by the use of the annular thrust rings, the design of the auger can incorporate a lower section modulus in the rib 30 for a given material, thereby reducing the overall weight of the apparatus.

It is to be noted that the bearing pressure between the auger and the delivery conduit can be selectively adjusted by controlling the pressure of the inflating fluid admitted to the chamber 40 of the ribbon 34. Such selective adjustment permits the auger to be used with a plurality of materials having varying densities and viscosities. Accordingly, the bearing and sealing pressure can be readily selected to accommodate the particular material to be conveyed.

As normal wear occurs between the auger and the conduit, the design of the conveyor, particularly the mounting of the inflatable, resilient ribbon 34, includes a provision for ready replacement of worn components. Naturally, the ribbon, being of a material of lesser hardness than the conduit 12, will be subjected to the greater wear. Removal and replacement is performed by removal of the auger from the conduit, demounting the plate 35 and substitution of a new ribbon for the worn element. The auger is inserted into and secured within the conduit, as described above. Accordingly, a screw conveyor is provided which is simple in design, light in weight, dependable in operation and adaptable to a variety of materials and environments.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A screw-type conveyor comprising a frame; material receiving means mounted thereon; means defining a cylindrical surface generated about an axis and providing an axial passageway in communication with said material receiving means; an auger having a periphery adapted to be received within said passageway; means mounting the auger for rotation about said axis with said periphery spaced at a predetermined interval from said cylindrical surface; inflatable resilient bearing and sealing means carried by said auger at its periphery, and when inflated bridging said interval and being in engagement with said cylindrical surface; and means in fluid communication with said bearing and sealing means to inflate the same.

2. A screw conveyor comprising a frame; a material receiving hopper mounted thereon; a delivery conduit having a cylindrical inner surface generated about a longitudinal axis, the conduit being in communication with the hopper; an auger having a periphery of a diametrical dimension less than the inside diameter of said conduit; means for rotatably mounting the auger within the conduit, a portion of the auger being received within the hopper; power means to rotate the auger; and inflatable sealing means carried by the auger at the periphery thereof and in sealing engagement with the inner surface of said delivery conduit.

3. In a conveyor having a material receiving hopper providing an internal cavity, and a tubular conduit having an axial passageway therethrough in communication with said hopper and an annular thrust member secured to the conduit and disposed in said passageway, means to advance material from the hopper axially through the conduit, said means comprising an auger having a centrally disposed longitudinally extended shaft, a rigid helical rib radially extended from the shaft, the radial dimension of the rib being less than the radial dimension of said conduit, a resilient ribbon of elastomer material secured to the rib and extended axially in sealing engagement with the conduit, said resilient ribbon being provided with an internal pressure chamber longitudinally extended through the length thereof, and valve means provided selectively to admit fluid under pressure to said chamber to inflate the ribbon and thereby control the engagement pressure of the conduit by said ribbon, and annular thrust bearing means carried at the periphery of the auger in engagement with the thrust member of said conduit.

4. A screw-type conveyor for flowable solid material, such as amorphic concrete and the like, comprising a frame; a material receiving hopper defining a cavity; a longitudinally extended tubular conduit having an axial passageway in communication with said cavity and providing a cylindrical inner surface generated about a longitudinal axis; an annular thrust reaction member circumscribing said axis and retained within said passageway; a helical auger having a periphery adapted to be received within the passageway, a portion of the auger being extended into said hopper cavity, the auger comprising a radially extended helical rib, the rib being provided with front, rear and peripheral surfaces, the peripheral surface being spaced from said inner surface of the conduit at a predetermined interval; a resilient member of ribbon form having a longitudinally extended pneumatic chamber formed therein; means mounting the resilient member on the helical rib; valve means in communication with the chamber selectively to inflate the resilient member to bridge said interval and to urge the resilient member into sealing engagement with said inner surface; and an annular thrust ring secured to the auger and in engagement with the thrust member carried by the tube.

5. The conveyor according to claim 4 wherein the conduit is provided with a discharge nozzle at one end of the auger, and at the other end of the auger a reaction plate having an aperture therein; and wherein seal means are carried by the auger at that end adjacent to said reaction plate.

(References on following page)

References Cited by the Examiner

UNITED STATES PATENTS

| | | | |
|---|---|---|---|
| 1,128,043 | 2/15 | Quigley. | |
| 1,731,455 | 10/29 | Neergaard | 302—50 |
| 1,966,325 | 7/34 | Welch. | |
| 2,225,215 | 12/40 | Guthrie | 198—64 |
| 2,489,980 | 11/49 | Rogers | 302—50 X |
| 2,513,784 | 7/50 | Blomquist | 198—64 |
| 2,630,906 | 3/53 | Philipp | 198—64 |
| 3,042,360 | 7/62 | Sneddon | 198—65 X |

SAMUEL F. COLEMAN, *Primary Examiner.*

WILLIAM B. LA BORDE, *Examiner.*